(12) United States Patent
Alford et al.

(10) Patent No.: US 8,337,759 B1
(45) Date of Patent: Dec. 25, 2012

(54) OZONE-BASED ODOR CONTROL SYSTEM FOR CONTROLLING HYDROGEN SULFIDE AND OTHER FOUL ODORS

(75) Inventors: Marvin F. Alford, Jacksonville, FL (US); Glenn Tyson, Jacksonville, FL (US)

(73) Assignee: Energy Engineering Systems, LLC, Jacksonville, FL (US)

( * ) Notice: Subject to any disclaimer, the term of this patent is extended or adjusted under 35 U.S.C. 154(b) by 0 days.

(21) Appl. No.: 13/224,426

(22) Filed: Sep. 2, 2011

(51) Int. Cl.
*A62B 7/08* (2006.01)
*A61L 2/24* (2006.01)

(52) U.S. Cl. ............................. 422/123; 422/3; 422/120

(58) Field of Classification Search .............. 422/3, 120, 422/121, 123
See application file for complete search history.

(56) References Cited

U.S. PATENT DOCUMENTS

| | | | |
|---|---|---|---|
| 6,375,904 B1 * | 4/2002 | Skillman et al. | 422/172 |
| 6,632,659 B1 * | 10/2003 | Den et al. | 435/297.1 |
| 2005/0175498 A1 * | 8/2005 | Nelson et al. | 422/4 |
| 2009/0010800 A1 * | 1/2009 | Resch et al. | 422/4 |
| 2012/0052791 A1 * | 3/2012 | Kurelowech | 454/329 |

* cited by examiner

*Primary Examiner* — Kevin Joyner
(74) *Attorney, Agent, or Firm* — Mark Young, P.A.

(57) ABSTRACT

An ozone-based system and method for eliminating odors from wastewater in a well produces an oxygen-enriched and controllably produces ozone using an ozone generator operably coupled to a programmable logic controller. In sparging mode the system supplies the oxygen enriched gas to the well. In ozonation mode the oxygen-enriched gas is used to produce ozone and the ozone is supplied to the injection port. The PLC reduces the amount of ozone produced by the ozone generator if the ozone measured at the reaction chamber outlet is not less than a setpoint amount. The reaction chamber contains a baffled reticulate interior channel causing gasses flowing therethrough to flow in opposite directions in traveling from the inlet to the outlet of the reaction chamber. The system is devoid of any fan or pump in the reaction chamber.

18 Claims, 5 Drawing Sheets

OZONE-BASED ODOR CONTROL SYSTEM FOR CONTROLLING HYDROGEN SULFIDE AND OTHER FOUL ODORS

FIELD OF THE INVENTION

This invention relates generally to odor sources that emit odiferous gasses, such as wastewater lift stations, and, more particularly, to an ozone-based system for eliminating odors emitted from such odor sources.

BACKGROUND

As one example of an odor source, wastewater lift stations or pump stations are used to "lift" liquid uphill—against gravity. They are an essential component of a wastewater collection system which takes wastewater from residents and businesses in a community and pumps it to a sewage treatment plant.

Managing a network of wastewater lift stations that pumps to the treatment plant is challenging. Accidental discharge of sewerage is a serious environmental hazard. Pumps can block, level sensing devices can fail, pipes can crack, lightning or power surges can damage control equipment, and power to control pumps can be interrupted. Discharge of gasses is also problematic. Not only are the discharged gasses pollutants, but some are quite odiferous. Thus, nearby residents and businesses may encounter extremely unpleasant odors originating from a lift station in the vicinity. Foul odors escaping the wet well air space has been a continual problem over the years, particularly in residential neighborhoods.

Odors are inevitable. Wastewater undergoing storage, transportation, and treatment will produce odors. The production of odors comes as a result of wastewater composition and depends on the environment and the time that the particular environmental conditions have existed. During some conditions, odors will escape through vents.

Gaseous emissions may include hydrogen sulfide ($H_2S$), ammonia ($NH_3$), carbon dioxide ($CO_2$), and methane ($CH_4$). Some other gasses resulting from biological activity are nitrogen ($N_2$), oxygen ($O_2$), and hydrogen ($H_2$). Most common sewer gasses are odorless except for hydrogen sulfide, which has the strong odor of rotten eggs, and ammonia, which has the odor of concentrated urine. The principal odor-causing gas in a wastewater lift station is hydrogen sulfide.

Many methods have been used over the years to control or mask the foul odors including: 1) feed of chemicals such as hydrogen peroxide into the liquid; 2) aeration of the liquid; 3) chemical scrubbers; 4) biological scrubbers; 5) oxidation in the wet well air space; and 6) activated carbon absorption. Chemicals can be extremely expensive. Several of the methods are not energy efficient or cost effective. Maintenance can also be expensive and cause excessive downtime of equipment. A cost effective odor reduction system that does not require replenishment of chemicals or a substantial capital investment is needed.

Further complicating matters, the volume and rate of odiferous gasses emitted can vary considerably based upon various factors, including temperature, dissolved oxygen, pH and well conditions such as volume. Hydrogen sulfide production increases at higher wastewater temperatures, and hydrogen sulfide released from wastewater will combine with water vapor to form sulfuric acid, which attacks sewers, manholes, wet wells, and other facilities. The presence of certain types of gasses in sewers depends on oxygen availability. When little oxygen is present, biological degradation is through anaerobic processes and the predominant gasses released will be hydrogen sulfide and methane. Another condition that promotes the release of hydrogen sulfide gas is wastewater pH. Sulfide exists in wastewater in the ionic form above pH 7.5. Below pH 7.5, sulfide leaves the wastewater in the gaseous form. Yet another condition is the volume of wastewater in a well and vapor pressure. When the wastewater level falls due to pumps pumping the liquid from the wet well, foul odor gasses are not discharged and fresh air is sucked into the wet well. However, when wastewater level rises due to increased wastewater production or precipitation, odiferous gasses are expelled. Thus, an effective odor reducing system must adapt to such changing conditions.

The invention is directed to overcoming one or more of the problems and solving one or more of the needs as set forth above.

SUMMARY OF THE INVENTION

To solve one or more of the problems set forth above, in an exemplary implementation of the invention, an ozone-based system for reducing odiferous gasses emitted from an odor source the system according to principles of the invention includes an air inlet, an air compressor drawing air in through the inlet and producing compressed air, a particulate filter for filtering particulate from the air, a cooling device for reducing the temperature of the compressed air, a water trap for removing moisture from the compressed air. The exemplary system also includes an $O_2$ concentrator for producing an oxygen-enriched gas by removing nitrogen from the compressed air. The ozone generator is operably coupled to a programmable logic controller configured to control production of ozone from the oxygen-enriched gas. The system also includes a reaction chamber with an outlet through which exhaust gasses flow, a sensor at the outlet, an inlet through which gasses emitted from the odor source are received, an injector through which ozone from the ozone generator is injected at the inlet of the reaction chamber, and a flow path (or interior channel) from the inlet to the outlet. The sensor at the outlet of the reaction chamber measures one or more parameters such as flow direction and volumetric flow rate, and/or odiferous gas concentration and supplies the measurement to the control system (e.g., to a PLC). The PLC controls the production of ozone by the ozone generator based upon the measurement of the parameter. The PLC reduces the amount of ozone produced by the ozone generator if the ozone concentration measured at the reaction chamber outlet is not less than a specified concentration. The reaction chamber has a baffled reticulate interior channel causing gasses flowing therethrough to flow in opposite directions (e.g., upwardly at some points and downwardly at other points or to the left at some points and to the right at other points) in traveling from the inlet to the outlet of the reaction chamber. The flow path is devoid of a fan, devoid of a pump and devoid of a blower to propel gasses through the flow path, and gasses passing through the flow path do not contact a fan, pump or blower. The term "fan" is used herein to denote all types of gas propulsion means, including fans, pumps and blowers.

Gasses may be propelled through the flow path by a pressure differential with an inlet pressure at the inlet of the reaction chamber through which gasses emitted from the odor source are received and an outlet pressure at the outlet of the reaction chamber, the inlet pressure being higher than the outlet pressure when odiferous gasses emitted from the odor source are forced out of the containment vessel by rising liquid level.

Alternatively, a blower may be provided outside of the flow path. The blower draws ambient air in through the blower inlet and propels the ambient air from the blower outlet to produce an ambient air flow. Induced draft piping may extend from the outlet of the blower into the flow path to supplying a flow of ambient air from the blower into the flow path towards the outlet of the reaction chamber. The flow of ambient air creates a pressure differential in the flow path that facilitates flow through the flow path from the inlet to the outlet of the reaction chamber. The flow also dilutes and aerates the exhaust gasses and increases the effective stack height by at least five feet above the actual height of the outlet.

Optionally, a PLC-controllable sparging valve is fluidly coupled to a conduit between the ozone generator and the injector at the inlet of the reaction chamber. In sparging mode, the system does not produce ozone and does not supplying ozone to the injector. Instead, in sparging mode the system supplies oxygen enriched gas from the $O_2$ concentrator through a sparging tube that extends into the odor source. In ozonation mode, the oxygen-enriched gas from the $O_2$ concentrator is supplied to the ozone generator and used to produce ozone which is supplied to the injector.

The system may employ any type of injector suitable for ozone injection. In an exemplary embodiment, an injection assembly with a plurality of spaced apart ports directed at the odor source is used. The inlet of the reaction chamber has a longitudinal axis. The spaced apart ports are disposed on opposite sides of the longitudinal axis. For example, an annular injector assembly with ports at various clock positions may be utilized.

An exemplary ozone-based method for eliminating odiferous gasses emitted from an odor source includes steps of drawing air through an air inlet, compressing the air with an air compressor, removing particulate from the air using a particulate filter, reducing the temperature of the compressed air using a cooling device, removing moisture from the compressed air using a water trap, producing an oxygen-enriched gas by removing nitrogen from the compressed air using an O2 concentrator, producing ozone from the oxygen-enriched gas using an ozone generator operably coupled to a programmable logic controller. The produced ozone is injected through an injection port at an inlet of a reaction chamber covering the well. The reaction chamber has an outlet and a plurality of sensors at the outlet. The reaction chamber also has an inlet through which gasses emitted from the wastewater are received and the injection port through which ozone is injected at the inlet of the reaction chamber. The reaction chamber contains a baffled reticulate interior channel. A plurality of sensors at the outlet of the reaction chamber measure at least flow direction and flow rate, or a concentration of at least one odiferous gas, and supplies the measurements to the PLC. The PLC reduces the production of ozone by the ozone generator as the flow rate out of the outlet or the concentration of odiferous gas decreases.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the particular components, shapes, configurations, relative sizes, ornamental aspects or proportions shown in the figures.

DETAILED DESCRIPTION

Ozone reacts with odiferous gasses exhausted from a source. While a wastewater well The ozone is generated at the point of use because it is subject to rapid decomposition, reverting to oxygen. The source gas is atmospheric air, which is always available in unlimited supply at no cost.

The ozone is generated from filtered, compressed, dried, oxygen-enriched ambient air. A high-quality feed gas is essential to the efficiency and long-term operability of the ozone generator. The feed gas must be dry, free of particulates and hydrocarbons, relatively cool, and at an appropriate pressure and flow for treatment.

Figure 1:
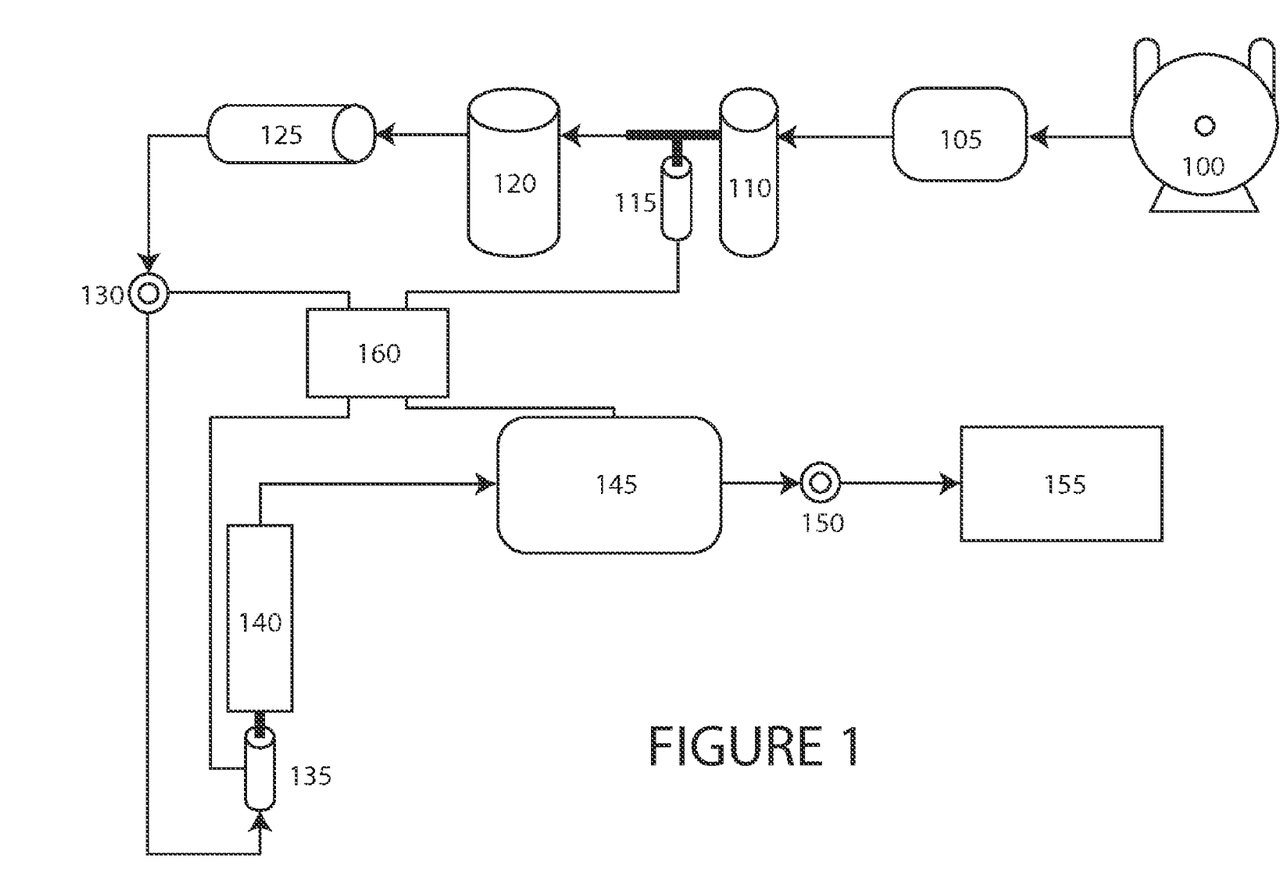
FIG. 1 is a high level schematic illustrating components of a ozonation system and steps of an ozonation process according to principles of the invention.

Referring to FIG. 1, an oil free air compressor 100 with filters compresses ambient air. Compression is necessary for oxygen concentration. Compression may increase the air pressure by 10 to 100 psi.

Particle filtration is important. If dust is allowed to collect on the dielectrics in a corona discharge ozonation device, it will decrease efficiency, increase dielectric stress, and cause breakage of the dielectrics. Since the tolerances between the conductors may be as small as 0.3 mm, a particle could span that gap, causing an arc within the generator that would result in failure of the dielectric and/or fuses. Therefore, filters are installed in the piping upstream from the ozone generator.

Using an oil-free compressor reduces risk of hydrocarbons in the source gas, which are vulnerable to oxidation by ozone. Oxidized hydrocarbons produce a black coating on the dielectrics that can decrease ozonation efficiency.

Next the temperature is reduced. The compression step increased the temperature of the air. Gaseous ozone decays rapidly at elevated temperatures. Thus, the heated compressed air is cooled with a tube and fin radiator 105 with air blowing across the fins. Other cooling devices may be used in lieu of or in addition to the tube and fin radiator 105. For example, a water-cooled after-cooler may be used downstream of the compressor 100.

Dryness is important. Gas with a high humidity not only decreases ozone production rate but also escalates contamination of dielectrics. For example, nitrogen pentoxide ($N_2O_5$) may develop, which can decompose into nitrogen dioxide ($NO_2$), which will interfere directly with ozone production. Nitrogen pentoxide in the presence of water vapor will produce nitric acid ($HNO_3$), which will cause corrosion in the ozone generator and have a detrimental effect on the dielectrics and increase the potential for their failure. Thus, water condensate is removed from the compressed cooled air with a water trap/filter 110.

A pressure sensor 115 measures pressure before the compressed, cooled and dried air enters the oxygen concentrator 120. The pressure sensor 115 is communicatively coupled to a control system, such as a programmable logic controller (PLC) 160. The invention is not limited to a PLC control system. Other types of control systems may be used, and are intended to come within the scope of the invention.

Next, the compressed, cooled and dried air is piped to a sieve oxygen concentrator 120 to remove nitrogen and increase the atmospheric 21% oxygen level to 90-95% oxygen. The particular type of oxygen concentrator is not particularly important so long as it is able to sufficiently increase the concentration of oxygen. In one embodiment, the oxygen concentrator 120 has a plurality of cylinders filled with zeolite, which selectively adsorbs the nitrogen in the air. In each cycle, air flows through one cylinder at a pressure of around 20 psig, where psig indicates the gauge pressure (138 kPa, or 1.36 atmospheres). The nitrogen molecules are captured by the zeolite in one cylinder, while the other cylinder is vented off to ambient atmospheric pressure allowing the captured nitrogen to dissipate. The oxygen concentrator 120 allows for a continuous supply of oxygen at a flow rate of up to approximately five liters per minute (LPM), or more, at concentrations from 90% to 95%. This process is called pressure swing adsorption (PSA).

The highly enriched oxygen is then filtered using filter 125 and monitored using an $O_2$ sensor 130, an air flow sensor 135 and a flow gauge 140 for both $O_2$ concentration and flow rate. The sensors 130, 135 are communicatively coupled to the PLC 160.

Next, and the enriched oxygen is passed through a high voltage plasma ozone generator 145 that breaks apart a portion of the oxygen ($O_2$) into the basic oxygen (O) molecules. Ozone is produced through electrical discharge when a gas stream containing oxygen is subjected to a high-voltage/high-density electrical current, which provides the energy to drive a reaction. An electrical field develops in a gap between two electrodes, one of which is coated with a dielectric material. Ozone is formed by splitting molecular oxygen into two atoms, which recombine with other oxygen molecules to produce ozone ($O_3$) at a concentration of about 5% to 8%. The ozone generator is 145 is communicatively coupled to the PLC 160.

While a high voltage plasma ozone generator 145 is preferred, other ozone generators may be used in lieu thereof. By way of example, an ultraviolet ozone generator 145 may be used. Ozone can be produced from molecular oxygen in the presence of UV light at 185 nm.

A stainless steel flow control valve 150 adjusts the total volumetric gas discharge of oxygen and ozone. The valve 150 may be a manually operated valve or a PLC controllable valve, such as a solenoid valve, operably coupled to the PLC 160.

Figure 2:
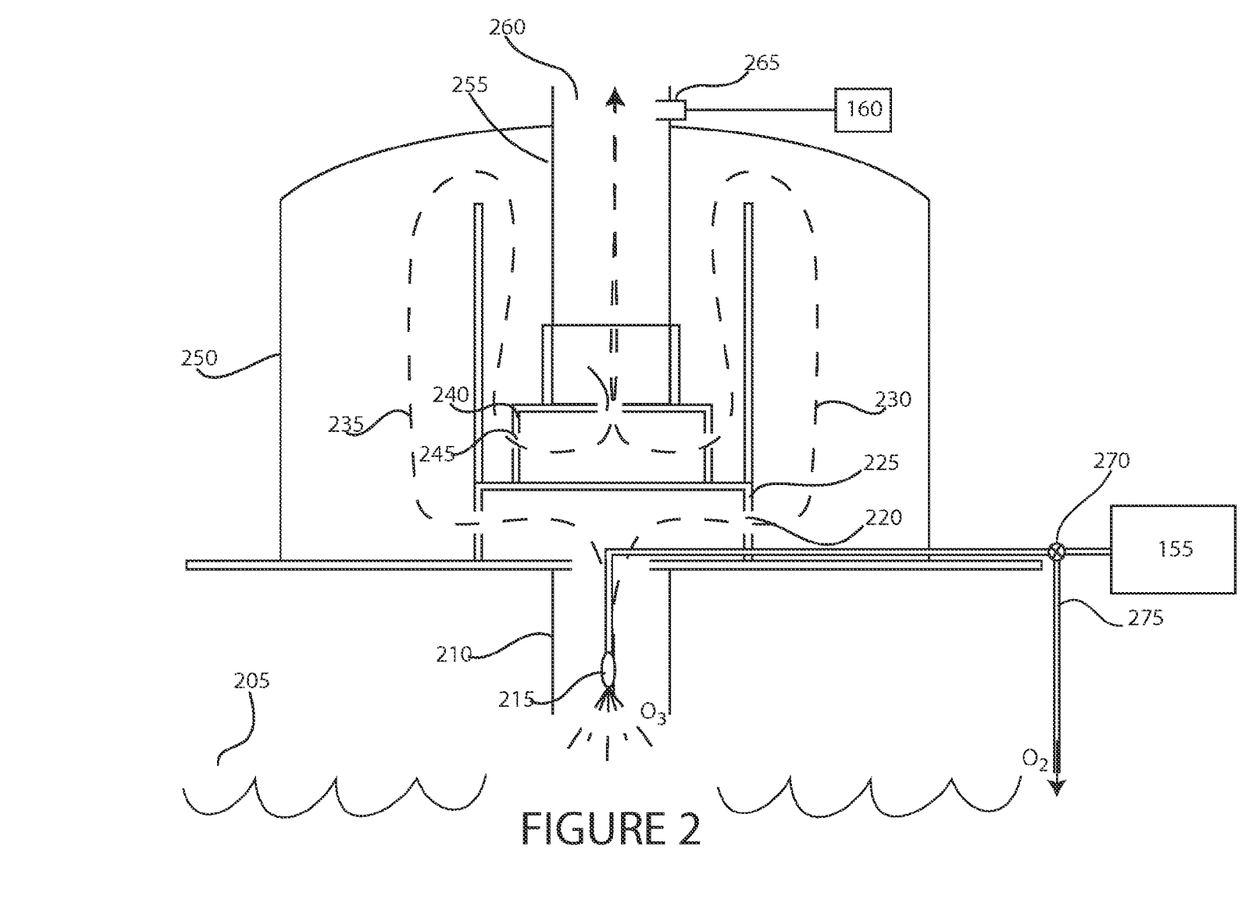
FIG. 2 is a high level schematic illustrating components of a reaction chamber and exhaust and steps of reaction and exhaust according to principles of the invention.

Next the ozone exits the ozone generation system, via exit port 155, shown in FIG. 1, and enters the outlet mixing system shown in FIG. 2. There the ozone mixes with odiferous gaseous compounds, including hydrogen sulfide, exiting the wastewater well 205.

Ozone is injected through a nozzle 215 into the wet well vent pipe 210. As the liquid level rises in the wet well, the sewer lift station gasses are forced from the below ground air space and through the ozone treated lift station vent pipe 210 and into a fiberglass baffled reaction chamber 250 that is located above the vent pipe. At the discharge point of the chamber 260, the residual hydrogen sulfide (H2S), residual ozone (O3), discharge flow and direction are all monitored with transducers/switches and sensors 265 communicatively coupled to the PLC 160.

An ozone sensor for sensing a concentration of ozone in exhaust gases must have good precision and reliability. Precision is important in order to sense ozone concentration with adequate resolution. Reliability is important in order to consistently sense ozone concentration in the presence foul gasses, foreign substances, fluctuating temperatures and fluctuating high levels of moisture. Unfortunately, commercially available ozone sensors tend to be unpredictable, as they are highly prone to faults and failure due to the hostile environment, including high levels of moisture. To avoid such problems, here hydrogen sulfide sensors are preferred.

One or more sensors 265 may be provided to detect one or more parameters indicative of either odiferous emissions or ozone or indicative of operating status. The parameters may include flow rate, flow direction, and concentration of odiferous constituents, and the like. Thus, the invention is not dependent upon unreliable and expensive ozone sensors. Illustratively, without limitation, the sensors 265 may include a flow rate sensor, a flow direction indicator, a hydrogen sulfide sensor, an ammonia sensor or a methane sensor. Flow rate is indicative of the volume of gasses being emitted and whether the unit is clogged. By determining or estimating the concentration of odiferous gasses (e.g., hydrogen sulfide) in the exhaust, the system may determine if ozonation should be increased, decreased or maintained. Flow direction may be sensed by a flow direction sensor in the flow path or by detecting whether pumps are running. When pumps are running, the liquid level in a lift station generally tends to drop. The falling liquid level draws atmospheric air into the system, at which time ozone generation may cease or be reduced to a minimum setting. When pumps are not running, the liquid level in the lift station tends to remain substantially the same or increase. An objective is to produce enough ozone to react with the emitted odiferous gasses, but not much more than is needed to react with the odiferous gasses. The invention is not limited to particular types of sensors. Thus, metal oxide sensors, or other types of commercially available sensors or means of detection and/or sensing, may be used. The PLC 160 manages ozone production based upon the sensor output.

By way of example and not limitation, the PLC may monitor the discharged gasses using the transducers/switches and sensors 265. A PLC set point of hydrogen sulfide ($H_2S$) and/or ozone ($O_3$) may be used to monitor and control the residual gas discharge levels. This is accomplished via closed loop control using the transducer feedback into the PLC to increase or decrease the ozone production level as needed. Other gas transducers may be used as the application may dictate.

To allow adequate mixing and reaction between ozone and the odiferous compounds, the gaseous mixture 230 is directed through a reticulate passageway, from a first cap 225 with a first opening 220, to a second cap 240 with a second opening 245, through a third opening 247 into the outlet pipe 255 (e.g., a PVC pipe). The gaseous mixture is forced to travel the height of the reaction chamber 250 and change flow directions between the first and second openings 220, 245. The first and second openings 220, 245 are actually a plurality of openings along the edges of their respective caps 225, 240.

When the liquid level falls due to pumps pumping the liquid from the wet well, foul odor gasses are no longer discharged and fresh air may actually be sucked into the wet well. Little or no ozone is needed during this period. At this time, the flow rate measured at the outlet by the PLC 160 using a flow rate sensor or flow direction sensor shows no flow out of the outlet, or flow into the outlet. Because odiferous gasses are not being emitted through the outlet at this time, the PLC 160 may deactivate the ozone generator or set it to generate minimum ozone. The oxygen concentrator may continue to operate. In such case, the oxygen-enriched gasses may be directed via a solenoid valve 270, the sparging valve, to sparge the highly enriched oxygen into the liquid through a sparging outlet 275. The PLC 160 controls switching of the sparging valve 270 from sparging mode to ozonation mode. Sparging is optional. When the sparging valve 270 is switched to sparging mode, the oxygen-enriched gasses, and possibly ozone, are supplied through the sparging outlet 275 (i.e., a conduit extending into the liquid comprising the odor source) into the liquid odor source, where the oxygen-enriched gasses bubble through the liquid. Oxygen aeration during sparging helps reduce the formation of hydrogen sulfide. When the sparging valve 270 is switched to ozonation mode, the ozone-containing gasses are supplied to the injector 215.

Advantageously, a system according to the present invention does not require any fan or blower, and does not have any fan or blower in the flow path of the odiferous gaseous emissions. Instead, it works with the flow induced by the changes in liquid level of a wastewater lift station. Wastewater lift stations are equipped with a vent. The level of the wastewater in a wastewater lift station rises as new wastewater is introduced. Such introduction of new wastewater occurs during usage of facilities connected to the wastewater system and during precipitation (e.g., rain storms). During hours of peak usage or precipitation, the rise can be substantial and rapid. Wastewater lift stations are equipped with pumps configured to operate periodically and maintain the liquid level below a determined maximum level. Generally, the level of contained wastewater falls when the pump is operating and rises when the pump is not operating. When the level of contained wastewater falls, ambient air is drawn through the vent into the lift station. When the level of contained wastewater rises, odiferous gasses above the liquid wastewater are urged out of the wastewater lift station through the vent into the atmosphere. Thus, the wastewater acts like a piston in a naturally aspirated engine, which draws air into the cylinders when the piston travels away from the intake valve, and forces gasses out of the cylinder when the piston travels towards the exhaust valve. This drawing in of atmospheric air when the wastewater level declines and forcing out of odiferous gasses when the wastewater level rises is referred to herein as "flow induced by changing wastewater level."

The invention works best with a good seal for all doors, ports and openings, except the exhaust vent. Gaskets, weather-stripping, and impervious covers (e.g., rubber mats) may be placed over all doors, ports and openings, except the exhaust vent. Preferably, the exhaust vent is the sole outlet for substantially all odiferous gasses expelled from the wastewater lift station. Consequently, a system according to the invention may treat the odiferous gasses expelled from the wastewater lift station through the vent, without appreciable volumes of odiferous gasses escaping treatment by emission through other gaps. Most prior art treatment systems do not attempt to seal off such other gaps.

One reason why prior art treatment systems are not concerned with sealing off gaps around openings, ports and doors, is that they use powerful high-volume fans or blowers to suck gasses through the vent. Thus, in the brute force approach of prior art systems, the gaps tend to act as an inlet through which atmospheric air enters, rather than as an outlet through which odiferous gasses may escape. However, the substantially continuous use of such fans or blowers is energy inefficient, creates considerable noise and is prone to failure. Failure occurs from the many hours of use while in the direct path of foul and corrosive emissions.

Figure 3:
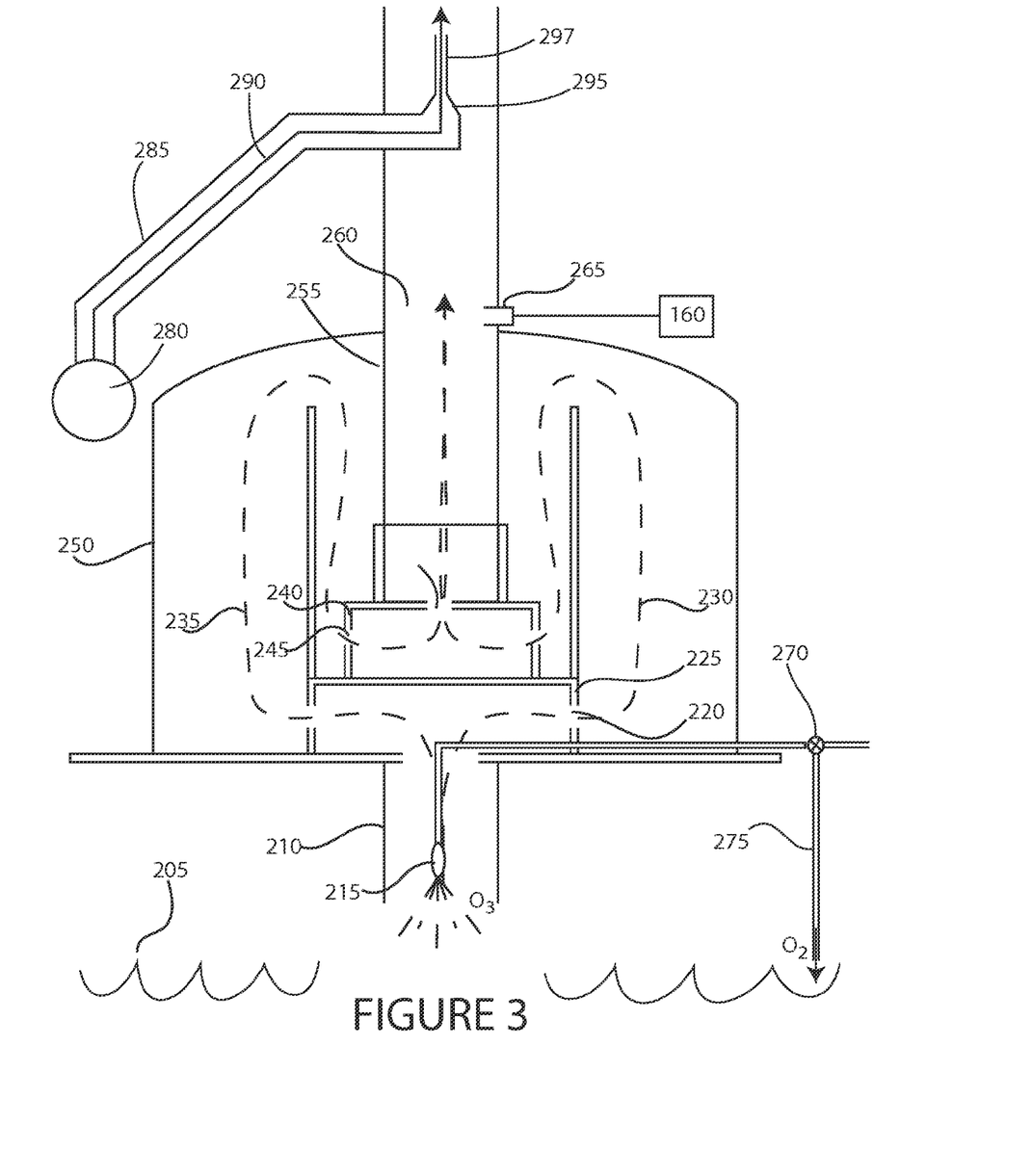
FIG. 3 is a high level schematic illustrating components of a reaction chamber and exhaust with an induced draft fan and steps of reaction and exhaust according to principles of the invention.

Optionally, an induced draft fan or blower is provided to facilitate flow through the exhaust channel. As shown in FIG. 3, an exemplary induced draft blower assembly includes a fan or blower 280 that draws in ambient air. Piping 285 is provided to direct the air from the blower 280 into the exhaust channel 260 in the direction of the outlet. The blower 280 forces the air through piping 285 into the exhaust channel 260. A nozzle 295 may be provided at the exit of the piping. Through a venturi effect, the flow of air passing into the exhaust stack 260 reduces the pressure downstream of the nozzle 295. The reduced pressure draws exhaust gasses through the stack 260. Advantageously, the induced draft fan or blower 280 is not in the exhaust channel, and is not otherwise exposed to the exhaust gasses that may corrode or foul the blower or fan.

The air supplied by the blower provides several other advantages. For example, the air dilutes any odiferous gasses and ozone in the exhaust. Post-reaction chamber dilution with air does not reduce effectiveness of the ozone reaction with odiferous compounds. Concomitantly, the injected air increases the velocity and momentum of the exhaust gasses, which increases the effective stack height, i.e., stack the height of the exhaust stack plus the height that the effluent gasses initially rise above the stack as a result of exhaust momentum, by at least five feet and preferably by at least ten feet. The blower may be selected to provide a desired increase in effective stack height. Increasing the effective stack height helps prevent accumulation of ozone and odiferous gasses near the ground.

Figure 4:
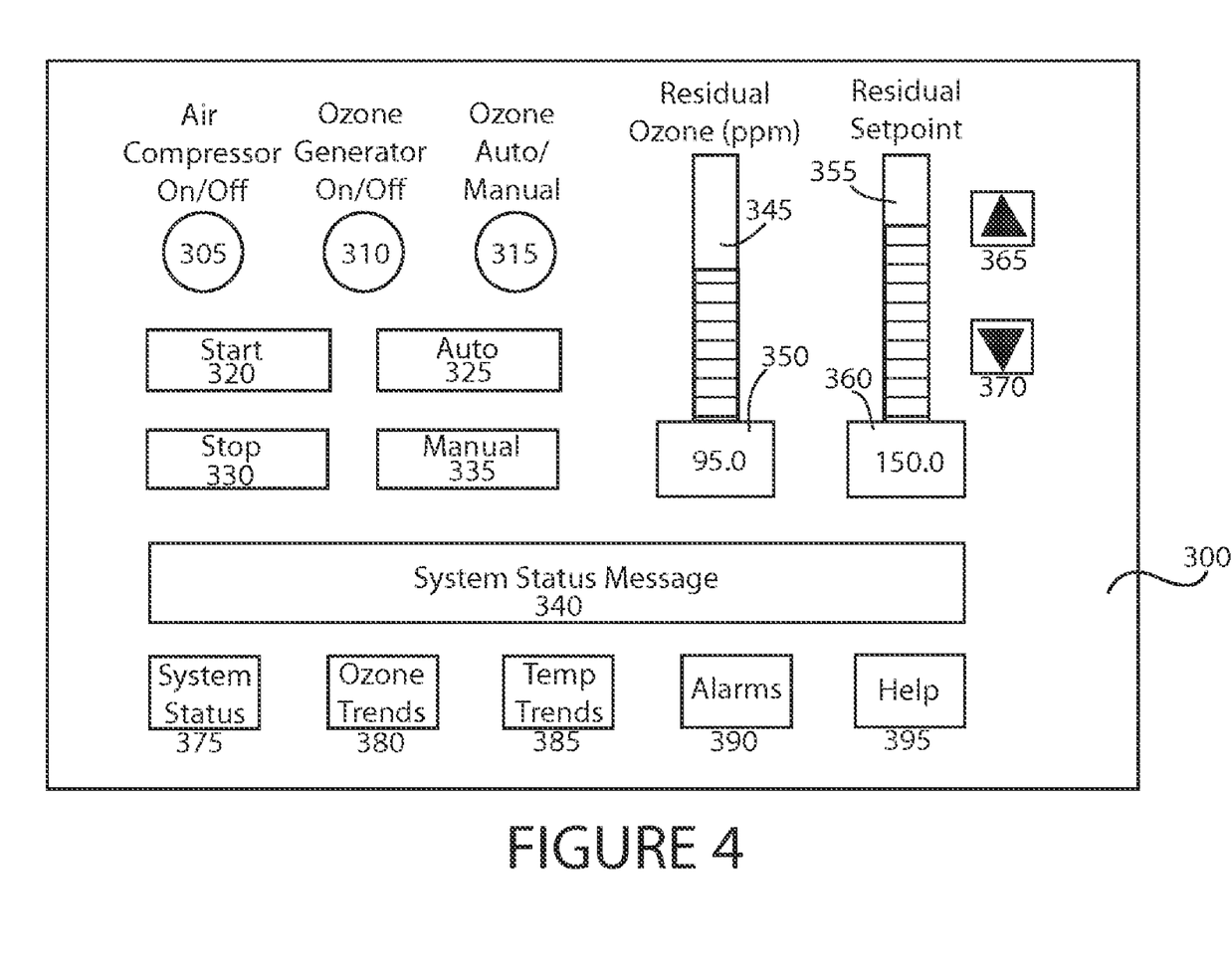
FIG. 4 is a schematic of a user interface illustrating process controls according to principles of the invention.

Referring now to FIG. 4, an exemplary touch-screen graphical user interface 300 is shown. The user interface 300, which may comprise a computer system, is operably coupled to the PLC 160. The user interface includes a control 305 for activating the air compressor 100, a control 310 for activating the ozone generator 145 and a control 315 for setting the ozone generator 145 to automatic or manual modes of operation. System start, stop, automatic and manual controls 320, 325, 330, 335, are also provided. A status message display is provided 340. Buttons to activate additional screens, including a system status screen 375, ozone trends (data regarding ozone produced and emitted) screen 380, temperature trends screen 385, an alarms screen 390 for managing alarm settings, and a help screen 395, are also provided.

Controls and displays are also provided for managing ozone level, using Proportional-Integral-Derivative (PID) closed loop control and the PLC 160. PID control is a control loop feedback methodology that calculates an "error" value as the difference between a measured process variable and a desired setpoint. The controller attempts to minimize the error by adjusting the process control inputs. PID control involves three separate parameters: the proportional, the integral and derivative values, denoted P, I, and D. P depends on the present error, I on the accumulation of past errors, and D is a prediction of future errors, based on current rate of change. The weighted sum of these three parameters is used to adjust the process via a control element such as a control or the power supply of the ozone generator.

The residual ozone is the measured amount at the outlet 260, and is shown both graphically 345 and numerically 350. The residual setpoint is the maximum limit set for the ozone at the outlet 260, and is shown both graphically 355 and numerically 360. The residual setpoint is a user-input value. The objective is to keep the residual ozone (i.e., ozone that has not reacted with odiferous gasses by the time it reaches the outlet 260) to below the residual setpoint. In automatic mode, the ozone generator 145 may be controlled to produce more or less ozone as required to maintain residual ozone below the setpoint.

Advantageously, the reaction chamber with ozone treats hydrogen sulfide and other foul odors. No fan or other device is required to suck or force the foul gasses from the wet well through the reaction chamber making the process more energy efficient. The natural rise and fall of the liquid level produces the flow of foul gasses from the wet well or fresh air into the wet well. The ozone is injected into the wet well vent pipe with a nozzle to mix the ozone and sewer gasses prior to entering the baffled reaction chamber. As another advantage, monitoring the volume of flow and direction into and out of the wet well via sensors 265 allows for making ozone when foul gas is being discharged by the rising liquid level and shutdown of ozone production when the liquid level is falling and ambient air is being pulled into the wet well. This makes the process more energy efficient and prevents excessive ozone, which can damage wet well components, from entering the wet well in any significant quantity.

As another advantage, the system monitors the residual discharge of hydrogen sulfide ($H_2S$) and ozone ($O_3$) with transducers and using Proportional-Integral-Derivative (PID) closed loop control with a Programmable Logic Controller (PLC) 160 for control of ozone production. The PID closed loop monitoring and control allows for energy efficiency manufacturing of the ozone production.

As another advantage, when ozone is not being produced, highly enriched oxygen (90-95%) can be sparged into the liquid to decrease the formation of hydrogen sulfide ($H_2S$). This not only benefits the odors being treated at the site due to this aeration, but gives downstream benefit due to the decreased hydrogen sulfide production.

As another advantage, the PLC 160 may include an integrated touch screen with graphic capabilities and a removable memory storage card. Various parameters such as hydrogen sulfide levels, ozone production, temperature, etc. are monitored and trended on the graphics screen and can also be stored on the removable memory card for historical analysis. A cellular modem may be attached to the PLC to allow both remote control of the system as well as remote viewing of the data and trends.

Figures 5, 6, 7:
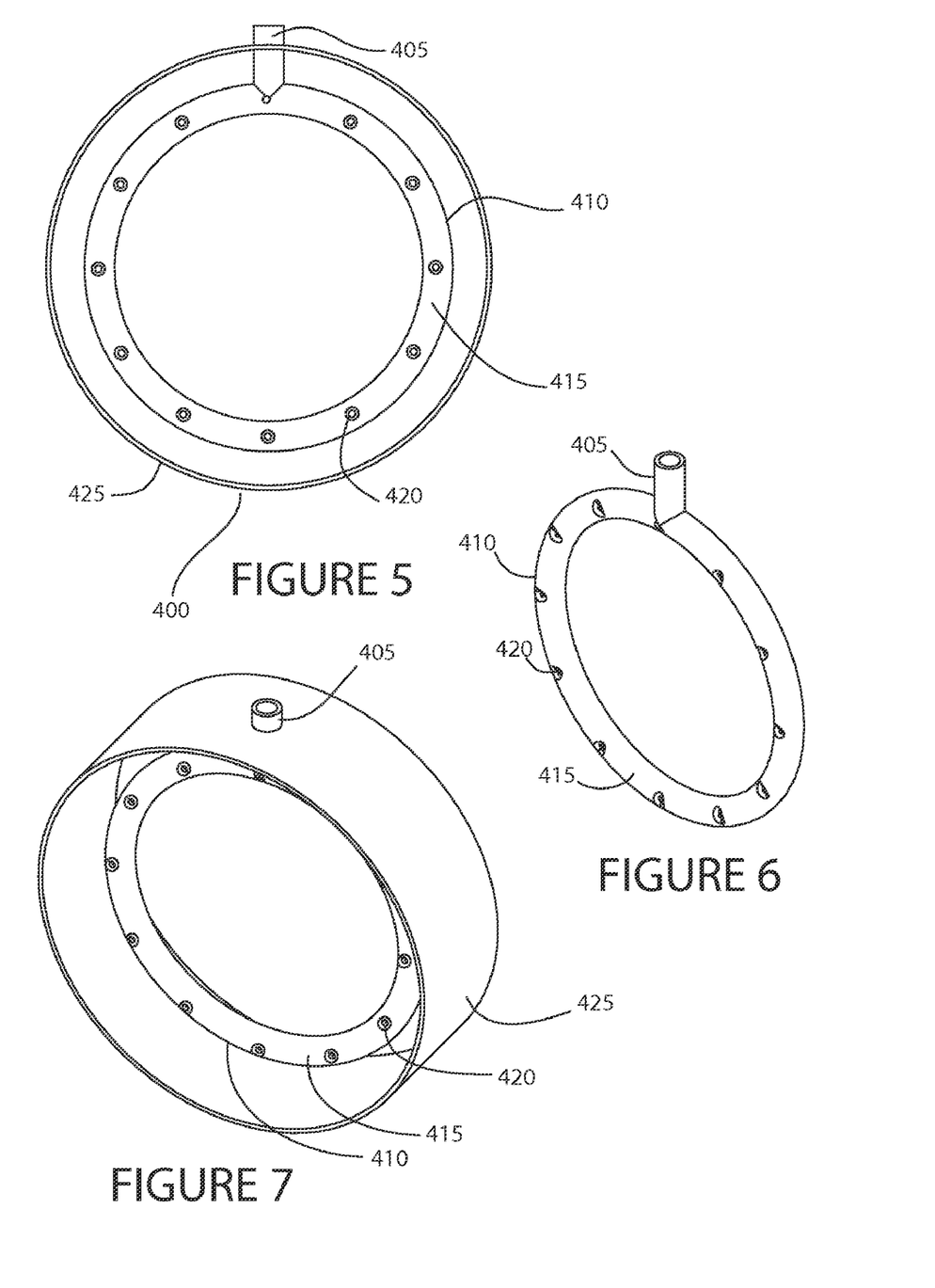
FIG. 5 is a front view of an exemplary annular ozone injector assembly according to principles of the invention.
FIG. 6 is a front view of an exemplary annular ozone injector according to principles of the invention.
FIG. 7 is a perspective view of an exemplary annular ozone injector assembly according to principles of the invention.

FIGS. 2 and 3 conceptually illustrate a single ozone injector 215 for simplicity. The injector is preferably configured to distribute injected ozone throughout the vent pipe 210. Referring to FIGS. 5 through 7, an exemplary annular ozone injector assembly 410 according to principles of the invention is illustrated. The exemplary assembly 410 includes an inlet 405, coupled to an annular injector 415 having a plurality of spaced apart injection ports 420. The ports 420 are directed towards the odor source 205. The annular injector 415 is positioned within a tube 425. The tube 425 may be the vent pipe 210. The injector 415 distributes ozone on opposite sides of the longitudinal axis extending through the vent pipe 210. In the exemplary embodiment, twelve evenly spaced injection ports 420 are provided. However, more or fewer injection ports 420 may be used without departing from the invention.

While the current installed applications are at sewer lift stations, the unique features can be applied to using ozone to oxidize gasses in other applications. It is anticipated that enhancements will be added to the system.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An ozone-based system for reducing odiferous gasses emitted from a wastewater lift station, said system comprising a containment vessel containing liquid and gasses, wherein the level of said liquid changes over time, and the containment vessel includes a liquid inlet, a liquid outlet, and a liquid level pump configured to pump liquid from the containment vessel through the liquid outlet when the liquid is above a determined level in the containment vessel, and said containment vessel includes a vent in fluid communication with ambient air of an atmosphere, said ozone-based system comprising:

a reaction chamber coupled to the vent, said reaction chamber comprising a gas outlet through which gasses flow to the atmosphere, said flow being induced by changing liquid level in the containment vessel, and a gas inlet fluidly coupled to the vent of the containment vessel, whereby, when the level of the liquid in the containment vessel substantially increases, gasses flow outward from said containment vessel flow through said vent and gas inlet and then through said gas outlet, and, when the level of the liquid in the containment vessel substantially decreases, ambient air flows inward through the gas outlet through said vent and gas inlet and then into the containment vessel, and a gas container fluidly coupling the gas inlet to the gas outlet, and at least one seal substantially sealing all openings in the containment vessel in fluid communication with ambient air, except for the vent, liquid inlet and liquid outlet, and an ozone generator operably coupled to a control system, said ozone generator being configured to controllably produce ozone and supply the produced ozone to the reaction chamber, and said control system controlling the production of ozone by the ozone generator based upon a determined parameter indicative of odiferous gasses emitted from the gas outlet.

2. The ozone-based system for reducing odiferous gasses emitted from a wastewater lift station of claim 1, said gas container comprising a flow path from the gas inlet to the gas outlet, said flow path defining a pathway for flow of gasses from the gas inlet to the gas outlet and from the gas outlet to the gas inlet, said flow path being devoid of any fan, and devoid of any blower, and devoid of any pump for propelling exhaust gasses.

3. The ozone-based system for reducing odiferous gasses emitted from a wastewater lift station of claim 1, wherein the determined parameter comprises direction of fluid flow at the gas outlet of the reaction chamber, and said control system includes a flow direction sensor, and said control system is configured to cease ozone production by the ozone generator as long as a sensed flow direction is inward through the gas outlet through the vent and gas inlet and then into the containment vessel.

4. The ozone-based system for reducing odiferous gasses emitted from a wastewater lift station of claim 1, wherein the determined parameter is flow rate measured at the gas outlet of reaction chamber, and said control system is configured to cause the ozone generator to reduce the amount of ozone produced as the flow rate measured at the gas outlet of the reaction chamber decreases, and said control system being configured to cause the ozone generator to increase the amount of ozone produced by the ozone generator as the flow rate measured at the gas outlet of the reaction chamber increases.

5. The ozone-based system for reducing odiferous gasses emitted from a wastewater lift station of claim 1,
   said control system being configured to determine if the liquid level pump is running or not running; and
   wherein the parameter measured at the gas outlet of reaction chamber is flow rate, and said control system is further configured to cause the ozone generator to reduce the amount of ozone produced as the flow rate measured at the gas outlet of the reaction chamber decreases if the liquid level pump is not running, and said control system being configured to cause the ozone generator to increase the amount of ozone produced by the ozone generator as the flow rate measured at the gas outlet of the reaction chamber increases if the liquid level pump is not running.

6. The ozone-based system for reducing odiferous gasses emitted from a wastewater lift station of claim 1,
   said control system being configured to determine if the liquid level pump is running or not running; and
   said control system being further configured to cause the ozone generator to produce a determined minimum amount of ozone if the liquid level pump is running.

7. The ozone-based system for reducing odiferous gasses emitted from a wastewater lift station of claim 1,
   said control system being configured to determine if the liquid level pump is running or not running; and
   said control system being further configured to cause the ozone generator to cease producing ozone while the liquid level pump is running.

8. The ozone-based system for reducing odiferous gasses emitted from a wastewater lift station of claim 1, wherein the parameter measured at the gas outlet of the reaction chamber is odiferous gas concentration, and said control system increases the amount of ozone produced by the ozone generator as the odiferous gas concentration measured at the reaction chamber outlet increases.

9. The ozone-based system for reducing odiferous gasses emitted from a wastewater lift station of claim 1, said gas container of the reaction chamber including a baffled reticulate interior channel through which gasses flow between the gas inlet and the gas outlet of the reaction chamber.

10. The ozone-based system for reducing odiferous gasses emitted from a wastewater lift station of claim 1, wherein gasses are propelled through the flow path by a pressure differential with an inlet pressure at the gas inlet of the reaction chamber through which gasses emitted from the odor source are received and an outlet pressure at the gas outlet of the reaction chamber, said inlet pressure being higher than the outlet pressure when odiferous gasses are emitted from the odor source.

11. The ozone-based system for reducing odiferous gasses emitted from a wastewater lift station of claim 1, further comprising a user interface having a control for setting a setpoint, the setpoint representing a maximum limit for the concentration of an odiferous gas in the exhaust gasses at the gas outlet.

12. The ozone-based system for reducing odiferous gasses emitted from a wastewater lift station of claim 1, further comprising an injector through which ozone from the ozone generator is injected at the inlet of the reaction chamber, said injector comprising an injection assembly with a plurality of spaced apart ports directed at the odor source, said inlet having a longitudinal axis, and said plurality of spaced apart ports being disposed on opposite sides of the longitudinal axis.

13. The ozone-based system for reducing odiferous gasses emitted from a wastewater lift station of claim 1, further comprising a first sensor at the gas outlet configured to sense flow rate, and a second sensor at the gas outlet configured to sense odiferous gas concentration, said first and second sensors being operably coupled to the control system.

14. The ozone-based system for reducing odiferous gasses emitted from a wastewater lift station of claim 1, further comprising a first sensor at the gas outlet configured to sense flow rate, and a second sensor at the gas outlet configured to sense odiferous gas concentration, and a third sensor at the gas outlet configured to sense flow direction, and said first, second and third sensors being operably coupled to the control system.

15. An ozone-based system for reducing odiferous gasses emitted from an odor source, said odor source comprising a containment vessel containing liquid and gasses wherein the level of said liquid changes over time, and said containment vessel includes a vent, said system comprising:
   an ozone generator operably coupled to a control system and configured to controllably produce ozone,
   a reaction chamber coupled to the vent, said reaction chamber comprising
      an outlet through which exhaust gasses flow, said flow being induced by changing liquid level in the containment vessel,
      at least one sensor at the outlet,
      an inlet through which gasses emitted from the vent of the odor source are received,
      an injector through which ozone from the ozone generator is injected at the inlet of the reaction chamber,
      a conduit fluidly and coupling the injector to the ozone generator; and
      a flow path from the inlet to the outlet, said flow path defining a pathway for flow of gasses from the inlet to the outlet, said flow path being devoid of any fan, and devoid of any blower, and devoid of any pump for propelling exhaust gasses; and
   said at least one sensor at the outlet of the reaction chamber being a sensor configured to sense a parameter from the group consisting of flow direction, flow rate, and odiferous gas concentration, and said at least one sensor being operably coupled to the control system, and
   said control system controlling the production of ozone by the ozone generator based upon the sensed parameter, and
   a conduit fluidly coupling the ozone generator to the injector at the inlet of the reaction chamber, a controllable sparging valve communicatively coupled to and controlled by the control system and fluidly coupled to the conduit between the ozone generator and the injector at the inlet of the reaction chamber, a sparging valve extending from the sparging valve into the liquid in the containment vessel, the sparging valve being operable in ozonation and sparging modes, the control system causing the sparging valve to switch between ozonation and sparging modes, and in sparging mode the system not supplying ozone to the injector, and in sparging mode the system supplying a gas containing oxygen through the sparging tube into the liquid in the containment vessel, and in ozonation mode producing ozone using the ozone generator and supplying the produced ozone to the injector.

16. An ozone-based system for reducing odiferous gasses emitted from an odor source, said odor source comprising a containment vessel containing liquid and gasses wherein the level of said liquid changes over time, and said containment vessel includes a vent, said system comprising:

an ozone generator operably coupled to a control system and configured to controllably produce ozone, a reaction chamber coupled to the vent, said reaction chamber comprising an outlet through which exhaust gasses flow, said flow being induced by changing liquid level in the containment vessel, at least one sensor at the outlet, an inlet through which gasses emitted from the vent of the odor source are received, an injector through which ozone from the ozone generator is injected at the inlet of the reaction chamber, a conduit fluidly and coupling the injector to the ozone generator; and a flow path from the inlet to the outlet, said flow path defining a pathway for flow of gasses from the inlet to the outlet, said flow path being devoid of any fan, and devoid of any blower, and devoid of any pump for propelling exhaust gasses; and said at least one sensor at the outlet of the reaction chamber being a sensor configured to sense a parameter from the group consisting of flow direction, flow rate, and odiferous gas concentration, and said at least one sensor being operably coupled to the control system, and said control system controlling the production of ozone by the ozone generator based upon the sensed parameter, and a blower outside of the flow path, said blower having a blower inlet and a blower outlet, said blower drawing ambient air in through the blower inlet and propelling the ambient air from the blower outlet into the flow path towards the gas outlet to produce an ambient air flow, said exhaust gasses from the reaction chamber not contacting the blower; and induced draft piping extending from the outlet of the blower into the flow path, said induced draft piping having a piping outlet directed towards the gas outlet of the reaction chamber, said induced draft piping supplying a flow of ambient air from the blower into the flow path towards the gas outlet of the reaction chamber, said flow of ambient air creating a pressure differential in the flow path that facilitates flow through the flow path from the gas inlet to the gas outlet of the reaction chamber.

17. The ozone-based system for reducing odiferous gasses emitted from a wastewater lift station of claim 16, said flow of ambient air diluting gasses from the containment vessel flowing through the flow path.

18. The ozone-based system for reducing odiferous gasses emitted from a wastewater lift station of claim 16, the gas outlet of the reaction chamber being at a first height and said flow of ambient air producing an effective stack height above the first height by at least five feet.

* * * * *